(12) United States Patent
Iyer et al.

(10) Patent No.: US 9,100,895 B2
(45) Date of Patent: Aug. 4, 2015

(54) CLIENT BALANCING IN WIRELESS NETWORKS

(75) Inventors: Pradeep Iyer, Cupertino, CA (US); Sachin Ganu, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 17 days.

(21) Appl. No.: 13/417,080

(22) Filed: Mar. 9, 2012

(65) Prior Publication Data

US 2012/0170455 A1 Jul. 5, 2012

Related U.S. Application Data

(63) Continuation of application No. 12/363,611, filed on Jan. 30, 2009, now Pat. No. 8,155,058.

(51) Int. Cl.
*H04W 4/00* (2009.01)
*H04W 48/06* (2009.01)
*H04W 28/08* (2009.01)

(52) U.S. Cl.
CPC .............. *H04W 48/06* (2013.01); *H04W 28/08* (2013.01)

(58) Field of Classification Search
CPC ............................... H04W 28/08; H04W 48/06
USPC .................................................. 370/310–350
See application file for complete search history.

(56) References Cited

U.S. PATENT DOCUMENTS

| 7,480,264 B1 | 1/2009 | Duo et al. |
| 2005/0265283 A1 | 12/2005 | Qi et al. |
| 2006/0064497 A1* | 3/2006 | Bejerano et al. ............... 709/228 |
| 2006/0146754 A1* | 7/2006 | Bejerano ........................ 370/332 |
| 2007/0115906 A1* | 5/2007 | Gao et al. ....................... 370/338 |
| 2008/0043637 A1 | 2/2008 | Rahman |
| 2008/0096575 A1 | 4/2008 | Aragon et al. |
| 2008/0181184 A1* | 7/2008 | Kezys ............................ 370/338 |
| 2009/0290489 A1* | 11/2009 | Wang et al. .................... 370/230 |
| 2009/0303930 A1* | 12/2009 | Ashley ........................... 370/328 |
| 2010/0195497 A1 | 8/2010 | Iyer et al. |

OTHER PUBLICATIONS

U.S. Appl. No. 12/363,611, Non-Final Office Action, mailed Jun. 22, 2010.
U.S. Appl. No. 12/363,611, Final Office Action, mailed Dec. 8, 2010.

* cited by examiner

*Primary Examiner* — Ricky Ngo
*Assistant Examiner* — Wei-Po Kao

(57) ABSTRACT

A method directed to receiving, by a network device, client density data of a first access node in a plurality of access nodes in a network. Also, the network device receives client density data of a second access node in the plurality of access nodes. The network device determines whether the client density data of the first access node overlaps with the client density data of the second access node. In response to the received client density data of the first access node overlapping with the received client density data of the second access node, the network device identifies the first access node and the second access node as members of a virtual radio frequency (RF) neighborhood, wherein the virtual RF neighborhood comprises a subset of a RF neighborhood. Each member of the virtual RF neighborhood is capable of receiving beacons from other members of the virtual RF neighborhood.

21 Claims, 1 Drawing Sheet

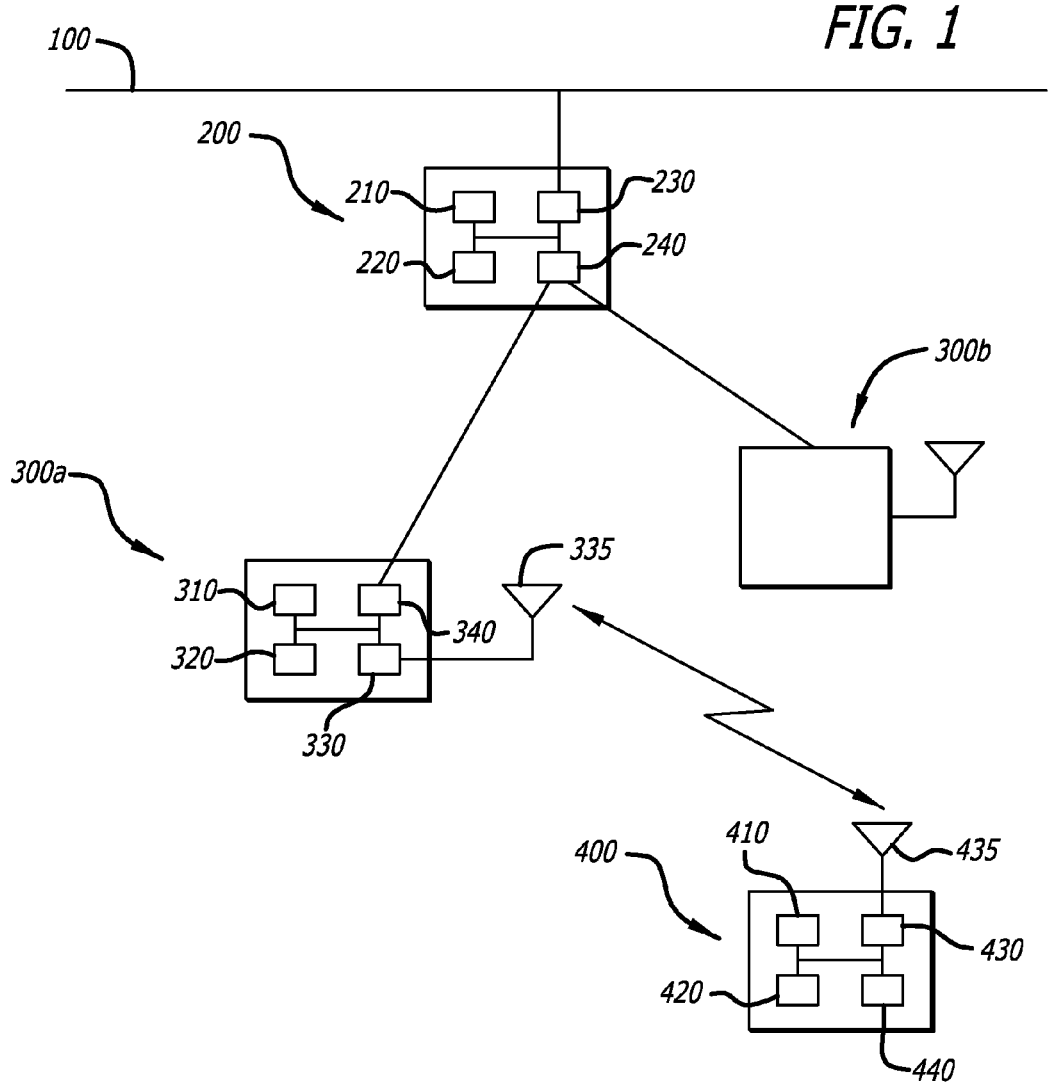
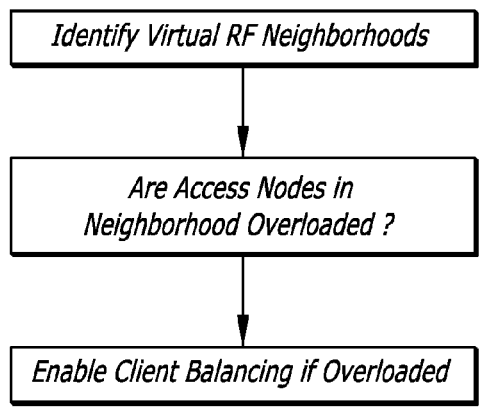

CLIENT BALANCING IN WIRELESS NETWORKS

RELATED APPLICATIONS

The present application claims priority from U.S. application Ser. No. 12/363,611, filed on 30 Jan. 2009, now U.S. Pat. No. 8,155,058, the entire contents of which are incorporated by reference herein.

BACKGROUND OF THE INVENTION

The present invention relates to wireless digital networks, and in particular, to the problem of balancing the client load among access nodes forming a wireless network.

Modern wireless digital networks typically consist of one or more access nodes connected to a controller, and typically provide services to wireless clients according to IEEE 802.11 standards.

Client devices typically select an access node to connect to based on signal strength. With client devices using such simple metrics to select an access node, some access nodes may have more of the client load than others.

What is needed is a way to distribute the client population across access nodes and channels to provide better network performance.

BRIEF DESCRIPTION OF THE DRAWINGS

The invention may be best understood by referring to the following description and accompanying drawings that are used to illustrate embodiments of the invention in which:

FIG. 1 shows a wireless network,

FIG. 2. shows a flowchart of client balancing.

DETAILED DESCRIPTION

Embodiments of the invention relate to methods for distributing clients in a wireless digital network. In an embodiment of the invention, access nodes connected to a controller identify Virtual RF Neighborhoods by collecting and processing data and sending this information to the controller, which correlates the data from the access nodes to form Virtual RF Neighborhoods. The controller identifies if a particular access node is overloaded based on the loads of that access node and the loads of its Virtual RF Neighborhood nodes report to the controller. Clients trying to connect to an overloaded access node are moved to neighboring access nodes by initially rejecting association requests to the overloaded access node.

As shown in FIG. 1, a wireless network operating according to 802.11 standards supports connections of wireless clients 400 to a wired network. Wired network 100, such as a wired IEEE 802.3 Ethernet network, is connected to controller 200. Controller 200 supports connections 250 to access nodes 300a, 300b. These access nodes provide wireless communications to wireless client 400.

As is understood in the art, controller 200 is a purpose-built digital device having a CPU 210, memory hierarchy 220, and a plurality of network interfaces 230, 240. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interfaces 230, 240 are typically IEEE 802.3 Ethernet interfaces to copper, although high-speed optical fiber interfaces may also be used. Controller 200 typically operates under the control of purpose-built embedded software, typically running under a Linux operating system, or an operating system for embedded devices such as VXWorks.

Similarly, as understood by the art, wireless access nodes 300a, 300b are also purpose-built digital devices. These access nodes include CPU 310, memory hierarchy 320, wireless interface 330 and wired interface 340. Wired interface 340 may be present but not used for direct communication with controller 200. As with controller 200, the CPU commonly used for such access nodes is a MIPS-class CPU such as one from Raza Microelectronics or Cavium Networks, although processors from other vendors such as Intel, AMD, Freescale, and IBM may be used. The memory hierarchy comprises read-only storage for device startup and initialization, fast read-write storage such as DRAM for holding operating programs and data, and permanent bulk file storage such as compact flash. Wireless access node 300 typically operate under control of purpose-built programs running on an embedded operating system such as Linux or VXWorks. Wireless interface 330 is typically an interface operating to the family of IEEE 802.11 standards including but not limited to 802.11a, b, g, and/or n. Wireless interface 330 is connected to antenna 335. At least one antenna is required for each band of operation. Some standards, such as draft 802.11n require multiple antennas per band of operation.

Client wireless device 400 may be a device such as a handheld or laptop computer, a wireless scanner, or other wireless digital device. It too has a CPU 410, memory hierarchy 420, wireless interface 430 with antenna 435, and additional I/O devices 440, which may include scanners, displays, keyboards, touch screens, and the like. A wider variety of CPUs may be used in such client devices, ranging from relatively low-power CPUS such as those from Acorn or Texas Instruments, to the higher-performance CPUs used in modern laptop computers from companies such as Intel and AMD. Wireless interface 430 typically operates to one or more IEEE 802.11 standards. In operation, to make use of network services, such as services available through wired network 100, a client device 400 must first associate with an access node 300, served by controller 200. Client device sends an association request to an access node, such as access node 300a.

According to an aspect of the invention, the process of client balancing over a group of access nodes comprises a sequence of steps as shown in FIG. 2. In the first step, Virtual RF Neighborhoods for access nodes are identified. Second, using the Virtual RF Neighborhood information, access nodes are examined to see if they are overloaded based on their load in comparison to the loads of their Virtual RF Neighborhood access nodes. Third, if an access node is identified as overloaded, clients trying to connect to the overloaded access node are moved to neighboring access nodes in the Virtual RF Neighborhood.

According to an aspect of the invention, access node AN2 is a virtual RF neighbor of access node AN1 if clients that can connect to AN1 can also connect to AN2. In one embodiment, this is computed by having each access node 300 advertise its client density to controller 200. Client density at an access node 300 is computed by tracking unique probe requests received by the access node from client devices over a predetermined period. One method of keeping such a client density is to track received signal levels hashed by a client identifier. One embodiment of this computation takes the four byte client MAC address contained in the probe request and computes a seven bit hash value; a seven bit hash value produces a Client Density array of 128 elements which is stored in memory hierarchy 320. A simple hash may be performed as the XOR of the four bytes of the client MAC address modulo 128. Other hash functions may also be used. Client density may be computed as a weighted RSSI of probe requests from client devices having that hash value. As an example, if H is the hash value used as an index into the Client Density array CD, CD[H]=CD[H]+Client_RSSI/15. This Client Density array is sent by the access node to the controller periodically, as an example, every 30 seconds. The sampling period and the length of the hash table may be adjusted to trade off table size with collision probability; the shorter the table, the higher the probability of a hash collision between client devices with different MAC addresses, while longer tables require more storage in memory hierarchy 320, and more time to transmit to the controller.

In controller 200, the RF Neighborhood of an access node is maintained by keeping track of access nodes which hear beacons from neighboring access nodes. The Virtual RF Neighborhood is a subset of the access node RF neighborhood, and is computed using the Client Density arrays received from the connected access nodes 300 and stored in memory hierarchy 320.

In one embodiment, Virtual RF Neighborhoods are computed by controller 200 by computing client density overlap between pairs of access nodes using the Client Density arrays provided periodically to the controller by each access node. It should be noted that while this computation is performed on pairs of access nodes, an access node may have more than one Virtual RF neighbor.

Assume the Client Density array for access node 300a is CDA1, and the Client Density array for access node 300b is CDA2. Assume also that CDA1 and CDA2 were collected during similar intervals. Since both access nodes use the same hashing function for collecting signal density, a client device seen by one access node should also be seen by the other access node if they are indeed neighbors. This would be represented by nonzero values in the same positions in arrays CDA1 and CDA2. If access node 300a and access node 300b are virtual RF neighbors, then a high proportion of client devices heard by access node 300a, as represented by nonzero values in CDA1, should have also been heard by access node 300b, as represented by nonzero values in CDA2, and vice versa, with a high proportion of client devices heard by access node 300b also heard by access node 300a.

One approach to performing this computation is to compute the percentage of nonzero entries in CDA1 which also have nonzero entries in CDA2; the number of nonzero slots in CDA1 which also have nonzero slots in CDA2 divided by the total number of nonzero slots in CDA1. Also compute the similar value, the percentage of nonzero entries in CDA2 which also have nonzero entries in CDA1. When both of these percentages exceed a threshold value, for example 50%, then access node 300b is considered to be a virtual RF neighbor of access node 300a.

The second step of the process is to identify whether an access node is overloaded in comparison to other access nodes in its Virtual RF neighborhood. This may be done at the controller by computing the channel load on a target access node as the number of clients on each channel for the target access node, and for Virtual RF neighbors of the target access node. Other figures of merit may also be used, such as the summed cross-product of clients and client traffic per channel. If the difference in access node loading on a particular channel is greater than a predetermined threshold amount, for example, 20%, then that channel and group of access nodes within a Virtual RF neighborhood may be subject to client balancing.

In one embodiment, the controller computes a load metric for each access node by channel. An access node may support operations on multiple channels. In one embodiment, this load metric may be simply the number of clients on the channel for the target access node, which is tracked by the controller. Given the target access node and examining the virtual RF neighbors of the target node as previously calculated, if all the virtual RF neighbors have client balancing enabled, then client balancing on the target access node is disabled. If the load metric, such as the number of clients in one channel (other than the target access node's channel) is a predetermined percentage, 20% for example, less than the number of clients in the target access node channel, then client balancing is disabled in the target access node.

When client balancing is disabled in an access node, association requests from clients are always accepted.

In the third step of the process, according to one embodiment of the invention, if client balancing is enabled for a target access node, Association Requests from new clients to the target node are handled in the following manner:

If the client device has been rejected two or more times from another access node connected to the same controller 200, accept the client association request.

If the client device has been rejected by the target access node and attempts to associate again with the target access node, accept the client association request.

If this is the first time the client device is trying to connect to the target access node, reject the request. Optionally, send a response code in the Association Response indicating that the access node is resource constrained.

In this manner, when client balancing is enabled, new association requests will be initially rejected by an access node having client balancing enabled, and the client device will most likely attempt to associate with an access node in the same Virtual RF neighborhood. If, however, the client device continues to send association requests to the same access node, even if it has client balancing enabled, eventually an association request will be accepted.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A method comprising:
receiving by a network device a first client density array of a first access node and a second client density array of a second access node in a plurality of access nodes in a network;
determining a first ratio based on a first number of first non-empty slots in the first client density array divided by a first total number of slots in the first client density array, wherein each of the first non-empty slots corresponds to a respective non-empty slot in the second client density array;
determining a second ratio based on a second number of second non-empty slots in the second client density array divided by a second total number of slots in the second client density array, wherein each of the second non-empty slots corresponds to a respective non-empty slot in the first client density array; and
in response to determining that one or more of the first ratio and the second ratio exceeding a predetermined threshold, identifying by the network device the first access node and the second access node as members of a virtual radio frequency (RF) neighborhood, wherein the virtual RF neighborhood comprises a subset of a RF neighborhood, each member of the virtual RF neighborhood being capable of receiving beacons from other members of the virtual RF neighborhood.

2. The method of claim 1, further comprising:
collecting by the network device first client density data of the first access node; and
advertising, by the network device the first client density data of the first access node.

3. The method of claim 2, wherein collecting the first client density data of the first access node comprises:
receiving a plurality of probe requests from a plurality of clients connected to the first access node, wherein each probe request comprises a client identifier;
tracking a subset of the plurality of probe requests received over a predetermined period of time, wherein the client identifier corresponding to each probe request in the subset is unique; and
determining the first client density data based on the tracked subset of the plurality of probe requests.

4. The method of claim 3, wherein tracking the subset of the plurality of probe requests comprises:
determining a respective signal level corresponding to a respective probe request in the subset of the plurality of probe requests;
computing a respective hash value based on the unique client identifier corresponding to the respective probe request; and
using the respective hash value as an index to store the respective signal level at a respective slot in an array.

5. The method of claim 1, further comprising:
determining by the network device whether the first access node is overloaded relative to other access nodes in the virtual RF neighborhood.

6. The method of claim 5, wherein determining whether the first access node is overloaded further comprises:
determining a first channel load corresponding to a total number of clients connected to the first access point;
determining a second channel load corresponding to an average number of clients connected to other access points in the virtual RF neighborhood of the first access point; and
determining that the first access point is overloaded in response to a difference between the first channel load and the second channel load exceeding a predetermined threshold.

7. The method of claim 5, further comprising:
balancing one or more clients attempting to connect to the first access node to the other access nodes in the virtual RF neighborhood in response to determining that the first access node being overloaded.

8. The method of claim 7, wherein balancing the one or more clients comprises one or more of:
rejecting a first association request to the first access node from a client in response to the first association request being an initial association request received from the client;
accepting a second association request from the client in response to a first threshold number of association requests being previously received by the access node from the client; and
accepting a third association request from the client in response to a second threshold number of association requests being previously received by other access nodes in the virtual RF neighborhood of the first access node.

9. The method of claim 8, wherein rejecting the first association request comprises:
responding to the client with an association response indicating that the first access node is resource constrained.

10. The method of claim 1, wherein the network device comprises the first access node.

11. The method of claim 1, wherein the network device comprises a network controller.

12. A network device comprising:
a memory;
a processor;
a receiving mechanism operating with the processor, the receiving mechanism to receive a first client density array of a first access node and a second client density array of a second access node in a plurality of access nodes in a network;
a determining mechanism operating with the processor, the determining mechanism to determine a first ratio based on a first number of first non-empty slots in the first client density array divided by a first total number of slots in the first client density array and a second ratio based on a second number of second non-empty slots in the second client density array divided by a second total number of slots in the second client density array, wherein each of the first non-empty slots corresponds to a respective non-empty slot in the second client density array and each of the second non-empty slots corresponds to a respective non-empty slot in the first client density array; and
an identifying mechanism operating with the processor, the identifying mechanism to identify the first access node and the second access node as members of a virtual radio frequency (RF) neighborhood in response to determining that one or more of the first ratio and the second ratio exceeding a predetermined threshold, wherein the virtual RF neighborhood of the first access node comprises a subset of a RF neighborhood, each member of the virtual RF neighborhood being capable of receiving beacons from other members of the virtual RF neighborhood.

13. The network device of claim 12, further comprising:
a collecting mechanism operating with the processor, the collecting mechanism to collect first client density data of a first access node; and
an advertising mechanism operating with the processor, the advertising mechanism to advertise the first client density data of the first access node.

14. The network device of claim 13,
wherein the receiving mechanism further to receive a plurality of probe requests from a plurality of clients connected to the first access node, wherein each probe request comprises a client identifier;
wherein the network device further comprises a tracking mechanism operating with the processor, the tracking mechanism to track a subset of the plurality of probe requests received over a predetermined period of time, wherein the client identifier corresponding to each probe request in the subset is unique; and
wherein the determining mechanism further to determine the first client density data based on the tracked subset of the plurality of probe requests.

15. The network device of claim 14,
wherein the determining mechanism further to determine a respective signal level corresponding to a respective probe request in the subset of the plurality of probe requests; and
wherein the tracking mechanism further to:
compute a respective hash value based on the unique client identifier corresponding to the respective probe request; and
use the respective hash value as an index to store the respective signal level at a respective slot in an array.

16. The network device of claim 12, wherein the determining mechanism further to determine whether the first access node is overloaded relative to other access nodes in the virtual RE neighborhood.

17. The network device of claim 16, wherein the determining mechanism further to:
determine a first channel load corresponding to a total number of clients connected to the first access point;
determine a second channel load corresponding to an average number of clients connected to other access points in the virtual RF neighborhood of the first access point; and
determine that the first access point is overloaded in response to a difference between the first channel load and the second channel load exceeding a predetermined threshold.

18. The network device of claim 16, further comprising:
a balancing mechanism operating with the processor, the balancing mechanism to balance one or more clients attempting to connect to the first access node to the other access nodes in the virtual RF neighborhood in response to determining that the first access node being overloaded.

19. The network device of claim 18, wherein the balancing mechanism further to perform one or more of:
rejecting a first association request to the first access node from a client in response to the first association request being an initial association request received from the client;
accepting a second association request from the client in response to a first threshold number of association requests being previously received by the access node from the client; and
accepting a third association request from the client in response to a second threshold number of association requests being previously received by other access nodes in the virtual RF neighborhood of the first access node.

20. The network device of claim 19, wherein, while rejecting the first association request, the balancing mechanism further to respond to the client with an association response indicating that the first access node is resource constrained.

21. A non-transitory computer readable medium, implemented within an access node within a wireless digital network, having a set of instructions stored therein, which when executed cause a set of operations to be performed, the operations comprising:
receiving a first client density array of a first access node and a second client density array of a second access node in a plurality of access nodes in a network;
determining a first ratio based on a first number of first non-empty slots in the first client density array divided by a first total number of slots in the first client density array, wherein each of the first non-empty slots corresponds to a respective non-empty slot in the second client density array;
determining a second ratio based on a second number of second non-empty slots in the second client density array divided by a second total number of slots in the second client density array, wherein each of the second non-empty slots corresponds to a respective non-empty slot in the first client density array; and
in response to determining that one or more of the first ratio and the second ratio exceeding a predetermined threshold, identifying the first access node and the second access node as members of a virtual radio frequency (RF) neighborhood, wherein the virtual RF neighborhood comprises a subset of a RF neighborhood, each member of the virtual RF neighborhood being capable of receiving beacons from other members of the virtual RF neighborhood.

\* \* \* \* \*

UNITED STATES PATENT AND TRADEMARK OFFICE
CERTIFICATE OF CORRECTION

| | | |
|---|---|---|
| PATENT NO. | : 9,100,895 B2 | Page 1 of 1 |
| APPLICATION NO. | : 13/417080 | |
| DATED | : August 4, 2015 | |
| INVENTOR(S) | : Pradeep Iyer et al. | |

It is certified that error appears in the above-identified patent and that said Letters Patent is hereby corrected as shown below:

Claims

In column 5, line 11, in Claim 2, delete "advertising," and insert -- advertising --, therefor.

In column 7, line 14, in Claim 16, delete "RE" and insert -- RF --, therefor.

Signed and Sealed this
Fifteenth Day of March, 2016

Michelle K. Lee
*Director of the United States Patent and Trademark Office*